Nov. 3, 1953 — O. M. BEAVER — 2,657,497
CASE FOR PROTECTING SNELLED FISHING HOOKS
Filed Jan. 25, 1951
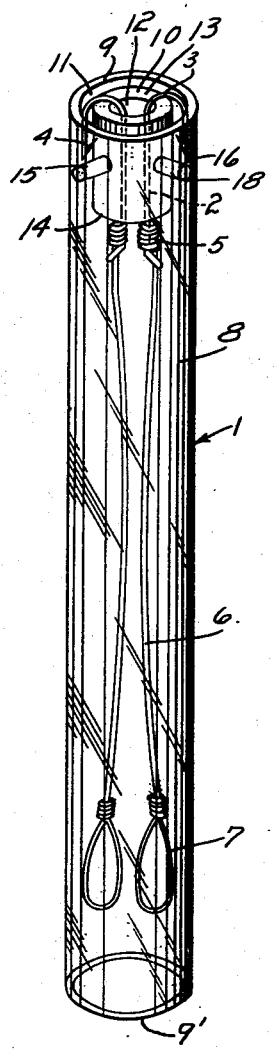
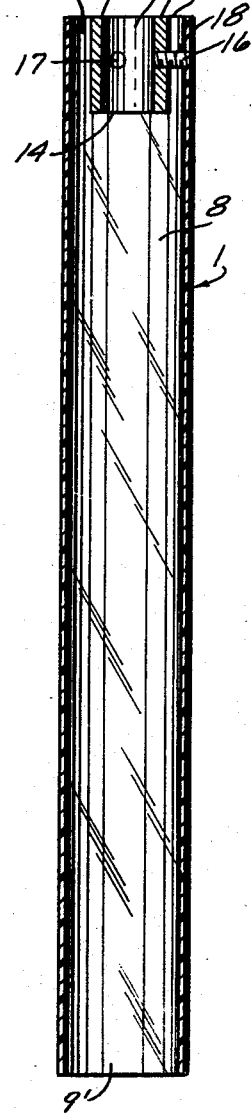
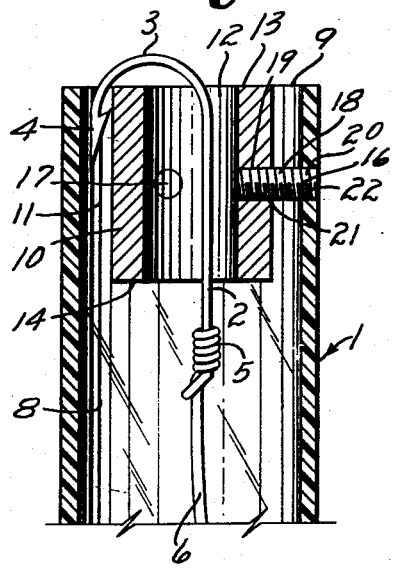
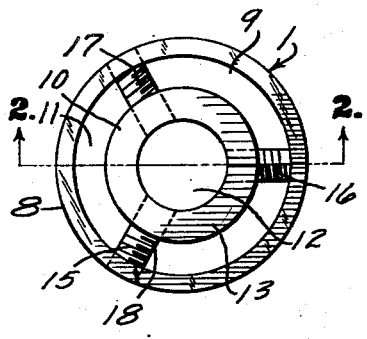
INVENTOR.
Oren M. Beaver
BY
Fishburn & Mullendore
ATTORNEYS Patented Nov. 3, 1953

2,657,497

UNITED STATES PATENT OFFICE 2,657,497

CASE FOR PROTECTING SNELLED FISHING HOOKS

Oren M. Beaver, Tulsa, Okla.

Application January 25, 1951, Serial No. 207,753

2 Claims. (Cl. 43—57.5)

This invention relates to a case for fishhooks particularly those equipped with leaders or snells, the principal object being to provide a case of this character in which the hooks and leaders thereof are retained in orderly arrangement and amply ventilated to assure drying thereof.

Other objects of the invention are to provide a case for snelled hooks having a magnet for retaining the hooks and preventing injury to the barbs thereof; and to provide a case that is open at its respective ends to facilitate insertion of the hooks and provide for through ventilation.

In accomplishing these and other objects of the invention as hereinafter pointed out, I have provided improved structure, the preferred form of which is illustrated in the accompanying drawing wherein:

Fig. 1 is a perspective view of a case constructed in accordance with the present invention and showing a plurality of snelled hooks encased therein.

Fig. 2 is a central longitudinal section through the case particularly illustrating the mounting of the magnet for retention of the hooks in position, the section being taken on the line 2—2 of Fig. 4.

Fig. 3 is an enlarged fragmentary section corresponding to Fig. 2, illustrating the retention of the hooks by the magnet.

Fig. 4 is an end view of the case.

Referring more in detail to the drawings:

1 designates a case constructed in accordance with the present invention and which is especially provided for encasing snelled fishhooks. Such hooks include a metal shank 2 having a curved portion 3 terminating in a barb 4. Fixed to the other end of the shank as indicated at 5 is a snell or leader 6 that is normally formed of transparent strand-like material and provided at the end opposite the hook with a loop 7 by which it is connected to a fishline. It is difficult for a fisherman to store his supply of snelled hooks without tangling of the leaders and injury to the hooks. It is also impossible to assure that the hooks and leaders are sufficiently dry when placed within the usual case.

The present invention therefore contemplates a case 1 that is formed of a non-metallic material such as one of the synthetic plastic resins having sufficient rigidity to retain the shape thereof. The case 1 may comprise a tube having a cylindrical wall 8 that is slightly longer than the total length of the hooks and leaders placed therein. The synthetic plastic selected is also preferably of transparent or translucent material so as to render the hooks and leaders visible and permit their ready selection when one of them is to be withdrawn from the case. The ends of the tube are open as at 9 and 9' to furnish ventilation through the case and provide for insertion of the hooks therein. Mounted within one end of the tube is a cylindrical magnet 10 of smaller outer diameter than the inner diameter of the tube to provide an annular space 11 therebetween, this space being open throughout the length of the tube. The magnet is provided with an axial bore 12 through which the leaders and shanks of the hooks are inserted in the case. The magnet also has pole faces 13 and 14 at its respective ends.

The magnet is retained in axial relation with the case by spacers 15, 16, and 17 which, in the illustrated instance, comprise threaded studs 18 having ends thereof 19 and 20 engaged in threaded openings 21 and 22 in the magnet and wall of the tube respectively, as best shown in Figs. 3 and 4.

The hooks are placed in the case by passing the looped ends of the leader through the open end 9 and the axial bore 12 of the magnet with the shank portion 2 of the hooks also passing through the bore 12 and the barb of the hooks passing into the annular space 11 encircling the magnet as best shown in Fig. 3. When thus positioned, the curved portion of the hooks are drawn into contact with the pole face 13 of the magnet and are therefore anchored so that the hooks are not accidentally displaced. A hook is readily selected and is easily withdrawn by grasping the curved portion 3 of the hook and pulling it out of the field of the magnet.

The hooks may be applied around the entire pole face 13 of the magnet. In fact, as many as two dozen snelled hooks may be placed within a single case of the size illustrated. When in position, the leaders hang freely within the tube and air circulates freely therearound by reason of the open ends of the case.

From the foregoing it is obvious that I have provided a case for snelled hooks which is of simple and inexpensive construction and which effectively retains the hooks and supports the snells so that they are kept in good condition.

What I claim and desire to secure by Letters Patent is:

1. A case for fish hooks, having shanks thereof provided with snells, said case including an elongated tube having a wall, forming a compartment for containing the hooks and snells and having open ends for air circulation through the compartment around the snells of said hooks, a permanent tubular magnet within said case forming a central passageway for the shanks of said hooks, means connected with the wall of the case and the permanent magnet to support said magnet in one end of the case with the central passageway coaxial with said case and for maintaining a surrounding space between the wall of the case and the magnet for freely accommodating points of said hooks, said magnet having ends forming pole faces with the pole face nearest said one end of the case providing a continuous ledge over which the hooks are engaged and retained responsive to the magnetic field of said magnet, said space between the magnet and the wall of the case being open throughout the length of the case to cooperate with the central passageway in providing air circulation around said hooks and the snells thereof.

2. A case for fish hooks, having shanks thereof provided with snells, said case including a cylindrical tube having an annular wall thereof, forming a compartment for containing the hooks and snells and having open ends, a cylindrical tubular magnet within said case forming a wall of smaller outer diameter than the inner diameter of the wall of the case and providing a central passageway for the shanks of said hooks, means spaced circumferentially of said magnet and connecting the magnet with the wall of the case to support said magnet in one end of the case with the central passageway coaxial with said case and for maintaining the magnet spaced from the wall of the case for freely accommodating points of said hooks, said magnet having ends forming annular pole faces with the pole face nearest said one end of the case providing a continuous annular ledge over which the hooks are engaged and retained responsive to the magnetic field of said magnet, the space between the magnet and the wall of the case being open throughout the length of the case to cooperate with the central passageway in providing air circulation around said hooks and the snells thereof.

OREN M. BEAVER.

References Cited in the file of this patent

UNITED STATES PATENTS

| Number | Name | Date |
|---|---|---|
| 595,998 | Garland | Dec. 21, 1897 |
| 1,451,295 | Driver et al. | Apr. 10, 1923 |
| 1,993,144 | Kasdan | Mar. 5, 1935 |
| 2,540,340 | Linblade | Feb. 6, 1951 |

FOREIGN PATENTS

| Number | Country | Date |
|---|---|---|
| 294,298 | Great Britain | July 26, 1928 |
| 912,073 | France | July 30, 1946 |

OTHER REFERENCES

Popular Science Monthly, vol. 156, issue No. 1, page 152, January 1950, published by Popular Science Publishing Company, 353 Fourth Ave., New York, N. Y.